United States Patent Office 2,912,462
Patented Nov. 10, 1959

2,912,462

SUBSTITUTED BICYCLIC DECANOLS AND DECANONES

Emanuel Goldstein, Paramus, and William C. Meluch, Maywood, N.J., assignors to The Trubeck Laboratories, East Rutherford, N.J., a corporation of New Jersey No Drawing. Application October 22, 1957
Serial No. 691,536

14 Claims. (Cl. 260—586)

This invention relates to a new class of compounds having valuable uses in perfumery and is directed particularly to bis gem dialkyl bicyclic decanols and decanones.

It has been discovered that those derivatives of bicyclo [4.4.0] decane which contain two gem dialkyl groups in one ring of the nucleus and have a keto- or alcohol group in the other ring of the nucleus have, in general, attractive and useful, woody odors reminiscent of the oils of sandalwood and cedar. The odors of compounds of this class vary considerably in intensity but even those compounds which possess but little odor are suitable for use as fixatives or blending agents.

The compounds of the present invention preferably are bicyclo [4.4.0] decanes wherein the para positions, 2 and 5, of one ring contain the two gem dialkyl groups, while the carbon atom at the 8 or 9 position of the other ring of the nucleus contains the ketonic or alcoholic function. The structural formula for such compounds may be represented by the formula:

I 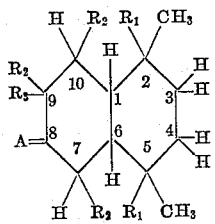

wherein $R_1$ is methyl or ethyl, $R_2$ is hydrogen or methyl, $R_3$ is hydrogen or lower alkyl and A is either an oxygen atom or a hydroxyl radical plus a hydrogen atom. The group A may be in the position 7 or 10, but compounds of this character are difficult to produce.

Although both the bis gem dialkyl bicyclo [4.4.0] decanols and decanones are useful in perfumery, the decanones are particularly valuable because of the intensity and persistence of their odors. Both the decanols and decanones are characterized by their stability in the presence of alkalies and, accordingly, they are readily adapted for use in soaps.

Compounds of the character to which the present invention relates may be derived from the appropriate phenols or hydroxy tetralins prepared by the procedure described by Bruson and Kroeger in the Journal of the American Chemical Society, vol. 62, page 36 (1940). The general method of preparation of the compounds may be represented by the following equation:

II 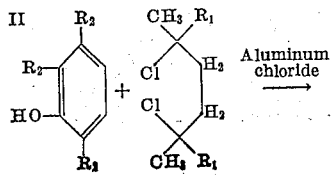

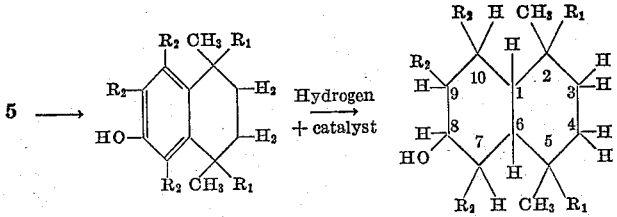

The corresponding ketones may be produced from the alcohol by the action of chromic acid or otherwise.

Those compounds where $R_3$ of Formula I is alkyl may be prepared by converting the keto-compound to a metallo derivative (e.g. to the sodio salt with sodium hydride) which is then treated with an alkyl halide to yield the $R_3$ alkyl substituted ketone. These ketones may be hydrogenated to produce the corresponding alcohols.

In order to indicate the general nature of the invention and typical procedures which may be employed in producing the compounds, the following examples are cited for purposes of illustration and without intending to limit the invention thereto.

*Example I.*—(2,2,5,5-tetramethyl bicyclo [4.4.0] decan-8-ol)

An autoclave was charged with 408 gms. 1,1,4,4-tetramethyl-6-hydroxy tetralin dissolved in 880 cc. methyl isobutyl carbinol and hydrogenated in the presence of Raney nickel catalyst at 300 to 535 p.s.i. and 155° to 168° C. The hydrogenation required about 5 hrs. After filtration to remove the catalyst, removal of methyl isobutyl carbinol was effected by distillation of the oil and a main fraction boiling at 139°–150° C. at 2 mm. of mercury pressure was collected. This fraction represented about 75% of theory. It had a solidification point of approximately 50° C. and had a musty and faintly woody odor.

*Example II*

Following the general procedure of Example I, the following additional bicyclodecanols were prepared:

| Bicyclo [4.4.0] Decan-8-ols | B.P. | M.P., degrees |
|---|---|---|
| 2,2,5,5,9-pentamethyl- | 140° at 7 mm. | |
| 2,2,5,5,10-pentamethyl- | 150° at 10 mm. | |
| 2,2,5,5,7,9-hexamethyl- | | 145–165 |
| 2,2,5,5-tetramethyl-9-ethyl- | 150° at 5 mm. | |
| 2,2,5,5-tetramethyl-9-butyl- | 145° at 2 mm. | |

All of these bicyclo decanols had musty odors with a faint musk character.

*Example III.*—(2,2,5,5-tetramethyl bicyclo [4.4.0] decan-8-one)

2,2,5,5-tetramethyl bicyclo [4.4.0] decan-8-ol (42 g.) (prepared according to the procedure of Example I) was dissolved in acetic acid at 60° C. and added in 1¼ hrs. to 55.6 g. of a 70% aqueous solution of sodium dichromate. The temperature was then maintained at 60° C. for an additional 2½ hrs. The reaction mixture was poured into 500 cc. cold water. Benzene was added, and the oil layer was separated and washed with 10% aqueous salt solution. The benzene was distilled out and the oil was fractionated to give 24.4 g. of a fraction boiling at 121° C. at 2 mm. of mercury pressure. This fraction, which was a mixture of the ketone with unreacted alcohol was heated with boric acid then fractionated to give 2,2,5,5-tetramethyl bicyclo [4.4.0] decan-8-one, boiling point 124° C. at 4 mm. of mercury pressure. The odor had a strong woody character.

*Example IV.—(2,2,5,5,9-pentamethyl bicyclo [4.4.0] decan-8-one)*

To a mixture of 106.8 g. 2,2,5,5,9-pentamethyl bicyclo [4.4.0] decan-8-ol, 200 g. acetic acid and 68 g. water, were added at 26°–45° C. in 1½ hrs. a solution of 97 g. of 85% phosphoric acid and 150 g. of 70% aqueous sodium dichromate. The temperature of the mixture was raised to 65° and then the mixture was allowed to stand overnight. The mixture was filtered from the precipitate and the oil separated, washed and distilled. Yield=67.5 g. purity (by hydroxylamine method)=96.3%. The product had a powerful woody odor.

*Example V*

Following the general procedure of Example IV, four additional bicyclodecanones were prepared from the corresponding bicyclodecanols:

| Bicyclo [4.4.0] Decan-8-ones | B.P. | Type of Odor |
|---|---|---|
| 2,2,5,5,10-pentamethyl- | 113° at 4 mm | Cedarwood with musk character. |
| 2,2,5,5-tetramethyl-9-ethyl- | 145° at 5 mm | Cedarwood vetiver with musk character. |
| 2,2,5,5,7,9-hexamethyl- | M.P. 150–158° | Faint, nitro musk. |
| 2,5-dimethyl-2,5-diethyl- | 145° at 2 mm | Cedarwood. |

*Example VI.—(2,2,5,5,9-pentamethyl-9-propyl bicyclo [4.4.0] decan-8-one)*

2,2,5,5,9-pentamethylbicyclo [4.4.0] decan-8-one (44.4 g.) was added in 30 minutes to a refluxing dispersion of 5.4 g. sodium hydride in 17.8 g. mineral oil and 200 cc. xylene. The mixture was refluxed an additional 1½ hrs., and additional 10% sodium hydride dispersion in mineral oil was added and the refluxing continued for an additional 1½ hrs. Then in 30 minutes 37.4 g. n-propyl iodide was added and the mixture was refluxed for 5 hrs. After cooling, 50 cc. acetic acid, followed by 100 cc. water, were added. The aqueous layer was separated and the oil layer was washed with water. After distilling off the solvent, the product was fractionated. The fraction (19.1 g.) boiling at 140°–149° at 5 mm. had a sweet, woody odor and analyzed (hydroxylamine method) 99.5% as 2,2,5,5,9-pentamethyl-9-propyl bicyclo [4.4.0] decan-8-one.

*Example VII.—(2,2,5,5,9,9-hexamethylbicyclo [4.4.0] decan-8-one)*

The procedure of Example VI was followed except that 31.0 g. of methyl iodide was used instead of the n-propyl iodide. The distilled product, 2,2,5,5,9,9-hexamethylbicyclo [4.4.0] decan-8-one, weighed 21.6 g. and had a sweet, woody odor. It boiled at 125°–127° at 4 mm.

*Example VIII.—(2,5-dimethyl-2,5-diethylbicyclo [4.4.0] decan-8-ol)*

1,4-dimethyl-1,4-diethyl-6-hydroxy-1,2,3,4-tetrahydronaphthalene (prepared by the procedure of Bruson and Kroeger from 3,6-dichloro-3,6-dimethyl octane and phenol) was hydrogenated with Raney nickel catalyst at 165°–175° and 600 p.s.i. Upon distillation the product was obtained in 85% yield, boiling at 152° at 3 mm. Analysis by percent hydroxyl=99%, as 2,5-dimethyl-2,5-diethylbicyclo [4.4.0] decan-8-ol. The odor was musty with a faint musk character.

The stability of the compounds of the present invention with respect to alkalies renders them particularly suitable for use in soaps. No evidence of discoloration or rancidity of soaps were noted in the following examples.

*Example IX*

2,2,5,5,9-pentamethylbicyclo [4.4.0] decan-8-one was added to white milled soap to produce a soap containing 1% of the ketone. After mixing and milling, bars of soap were produced. After standing four months the soap showed no discoloration and still exhibited a strong woody odor reminiscent of vetiver-cedarwood with some musky character.

*Example X*

The conditions of Example IX were repeated with 2,2,5,5,9-pentamethylbicyclo [4.4.0] decan-8-ol. After four months the soap (containing 1% of the alcohol) showed no discoloration and exhibited a faint, woody odor.

The compounds of the present invention may be produced by procedures other than those suggested above, and the substituents in the molecule can be varied considerably to obtain modified effects. Similarly, when desired, the compounds may be mixed and blended with each other and with fixitives, blending agents and other modifiers, diluents or additives in order to obtain desired results.

In view thereof it should be understood that the particular compounds cited and the methods of producing and using the same which have been described above have been cited for the purpose of indicating the nature of the invention and typical procedures in accordance therewith and are not intended to limit the scope of the invention.

We claim:

1. A compound having the composition indicated by the formula

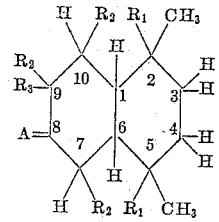

wherein $R_1$ is selected from the group consisting of methyl and ethyl radicals, $R_2$ is selected from the group consisting of hydrogen and the methyl radical, $R_3$ is selected from the group consisting of hydrogen and lower alkyl radicals, and A is selected from the group consisting of oxygen and a hydroxy radical plus hydrogen.

2. A 10-methyl-2,2,5,5-tetraalkyl bicyclo [4.4.0] decan-8-one wherein the alkyl groups contain no more than 2 carbon atoms.

3. A 10-methyl-2,2,5,5-tetra-alkyl bicyclo [4.4.0] decan-8-ol wherein the alkyl groups contain no more than 2 carbon atoms.

4. A 7-methyl-9-lower alkyl substituted 2,2,5,5-tetraalkyl bicyclo [4.4.0] decan-8-one wherein the alkyl groups contain no more than 2 carbon atoms.

5. A 7-methyl-9-lower alkyl substituted 2,2,5,5-tetraalkyl bicyclo [4.4.0] decan-8-ol wherein the alkyl groups contain no more than 2 carbon atoms.

6. 2,2,5,5-tetraalkyl bicyclo [4.4.0] decan-8-one wherein the alkyl groups contain no more than 2 carbon atoms.

7. A 9-lower alkyl substituted 2,2,5,5-tetraalkyl bicyclo [4.4.0] decan-8-one wherein the alkyl groups contain no more than 2 carbon atoms.

8. 2,2,5,5-tetraalkyl bicyclo [4.4.0] decan-8-ol wherein the alkyl groups contain no more than 2 carbon atoms.

9. A 9-lower alkyl substituted 2,2,5,5-tetraalkyl bicyclo [4.4.0] decan-8-ol wherein the alkyl groups contain no more than 2 carbon atoms.

10. 2,2,5,5-tetramethyl bicyclo [4.4.0] decan-8-one.

11. 2,2,5,5-tetramethyl bicyclo [4.4.0] decan-8-ol.

12. 2,2,5,5,9-pentamethyl bicyclo [4.4.0] decan-8-one.

13. 2,2,5,5,10-pentamethyl bicyclo [4.4.0] decan-8-one.

14. 2,2,5,5-tetramethyl-9-ethyl bicyclo [4.4.0] decan-8-one.

References Cited in the file of this patent

UNITED STATES PATENTS 2,802,880  Stoll et al. _____ Aug. 13, 1957
2,826,604  Erner _____ Mar. 11, 1958

OTHER REFERENCES

Prelog et al.: Chem. Abstracts, vol. 44, p. 2486 (1950).
Julia: Chem. Abstracts, vol. 49, pp. 10906–7 (1955).

UNITED STATES PATENT OFFICE

CERTIFICATE OF CORRECTION

November 10, 1959

Patent No. 2,912,462

Emanuel Goldstein et al.

It is hereby certified that error appears in the above numbered patent requiring correction and that the said Letters Patent should read as corrected below.

In the grant, lines 2 and 3, and line 13, and in the heading to the printed specification, line 5, name of assignee, for "The Trubeck Laboratories" read -- The Trubek Laboratories --.

Signed and sealed this 26th day of April 1960.

(SEAL)

Attest:

KARL H. AXLINE
Attesting Officer

ROBERT C. WATSON
Commissioner of Patents